United States Patent Office 3,424,851
Patented Jan. 28, 1969

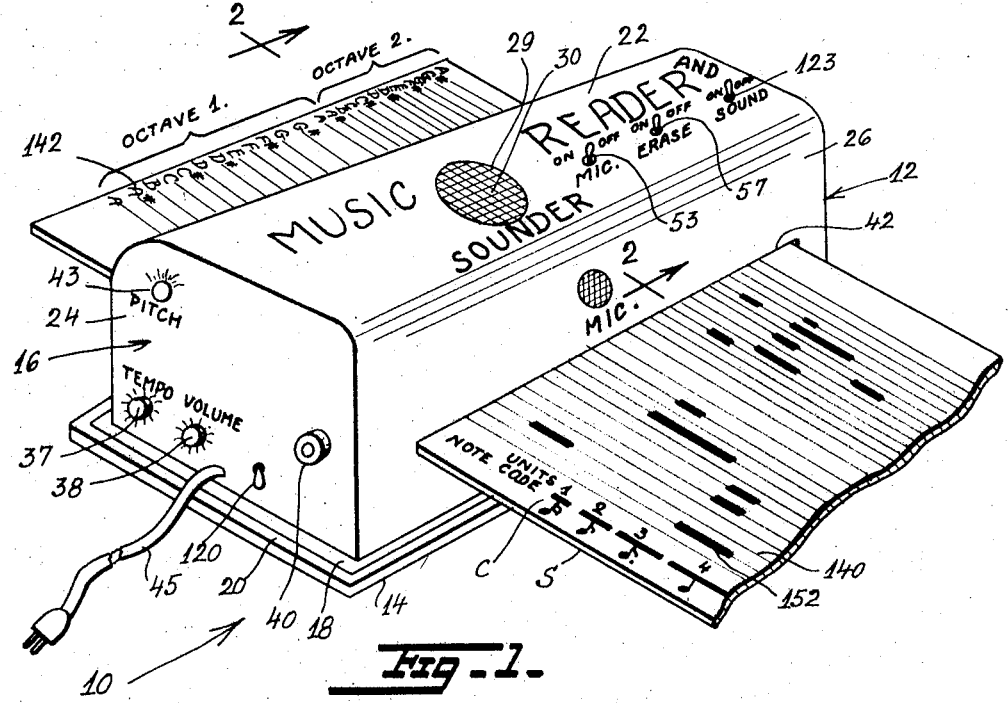
Fig. 1.
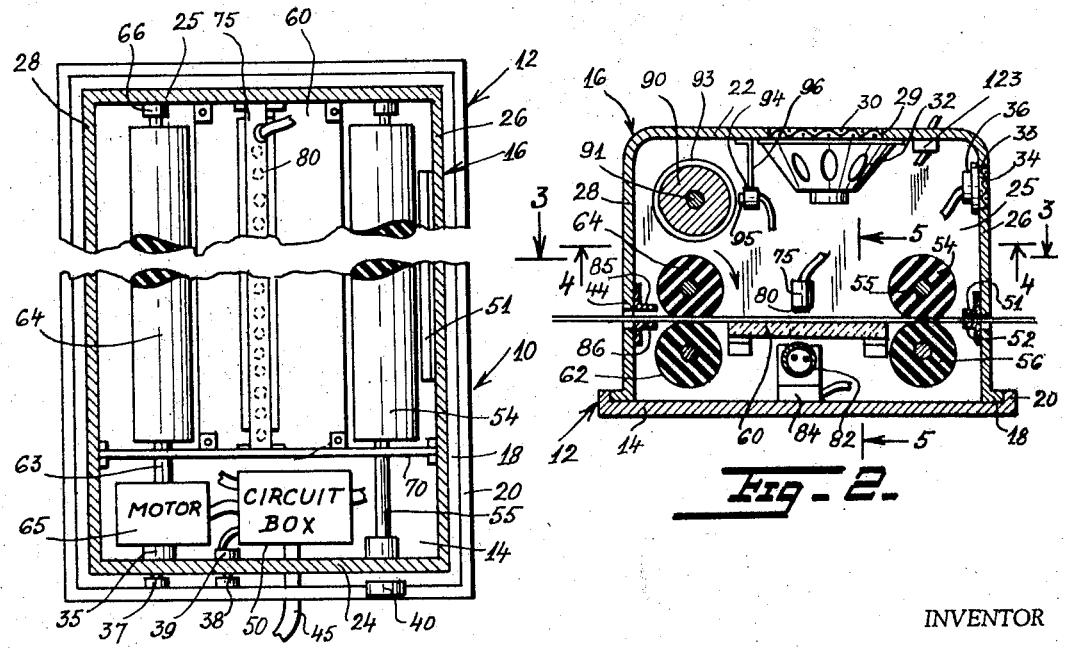
Fig. 2.
Fig. 3.
INVENTOR
Dorothea M. Weitzner

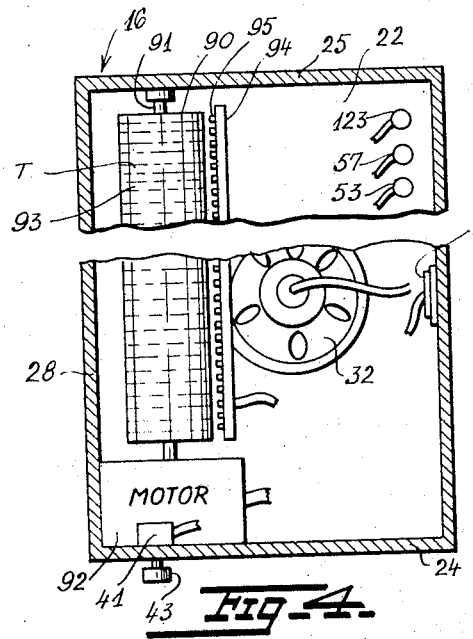
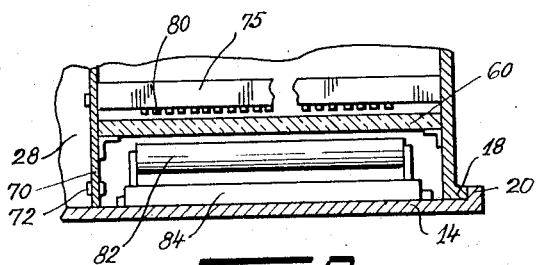
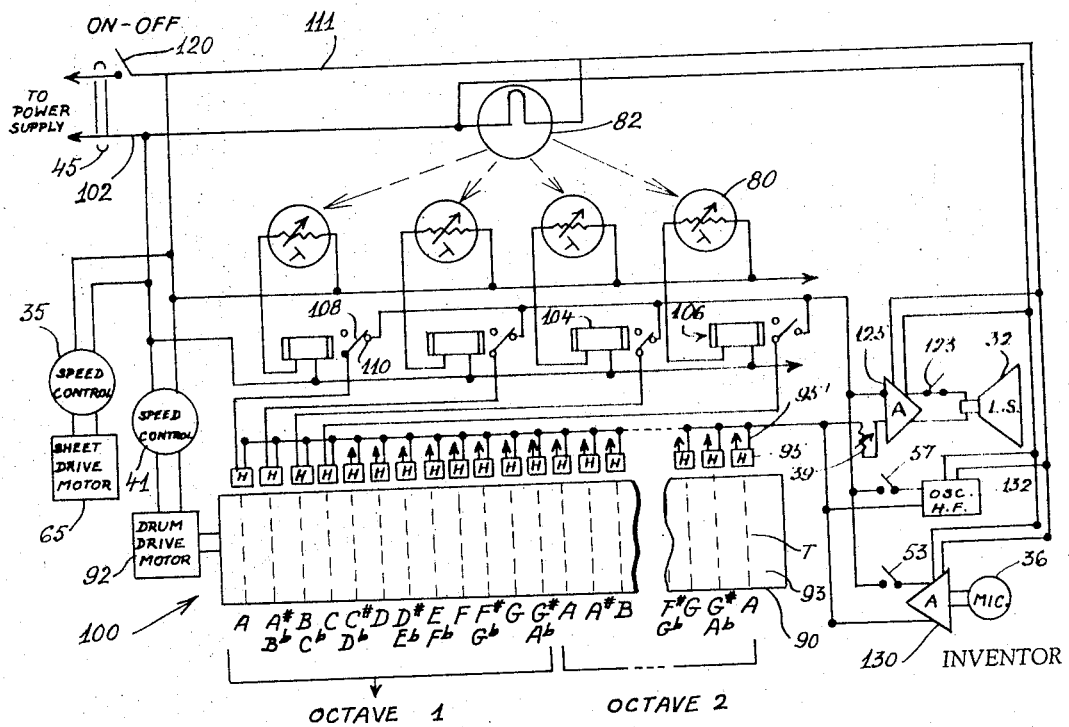

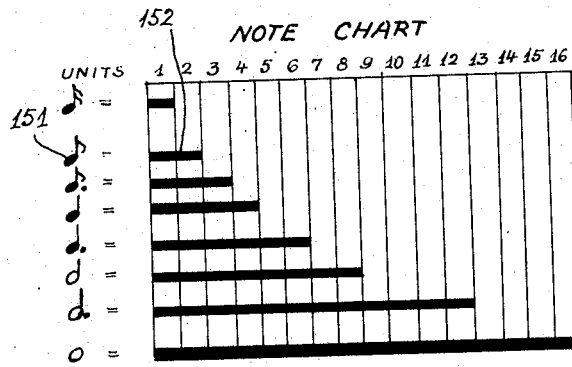
Fig-7-
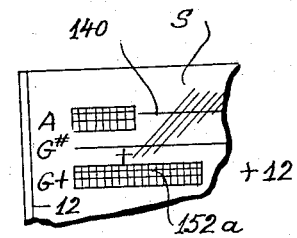
Fig-11-
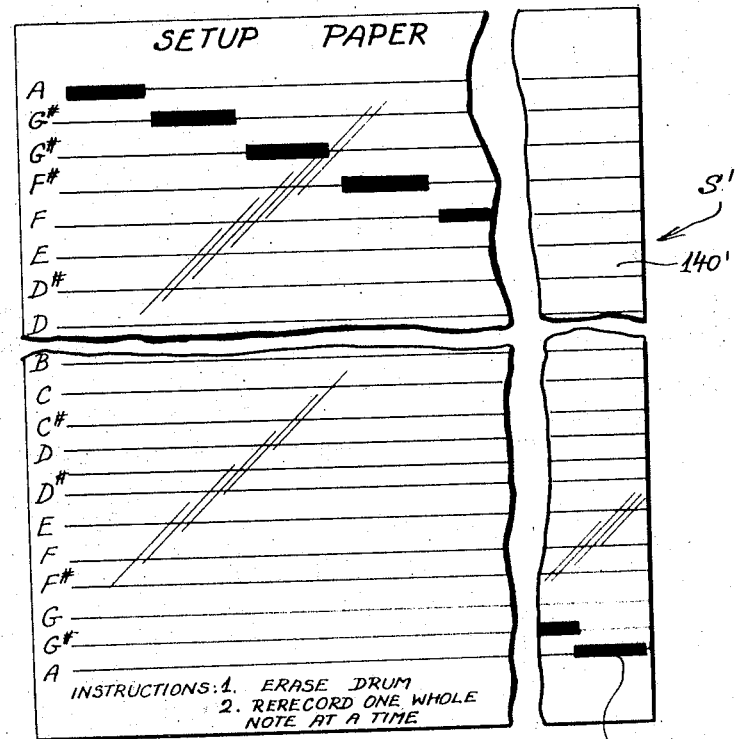
Fig-8-
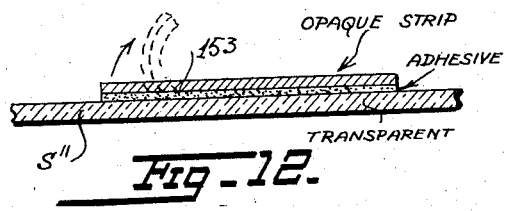
Fig-12-

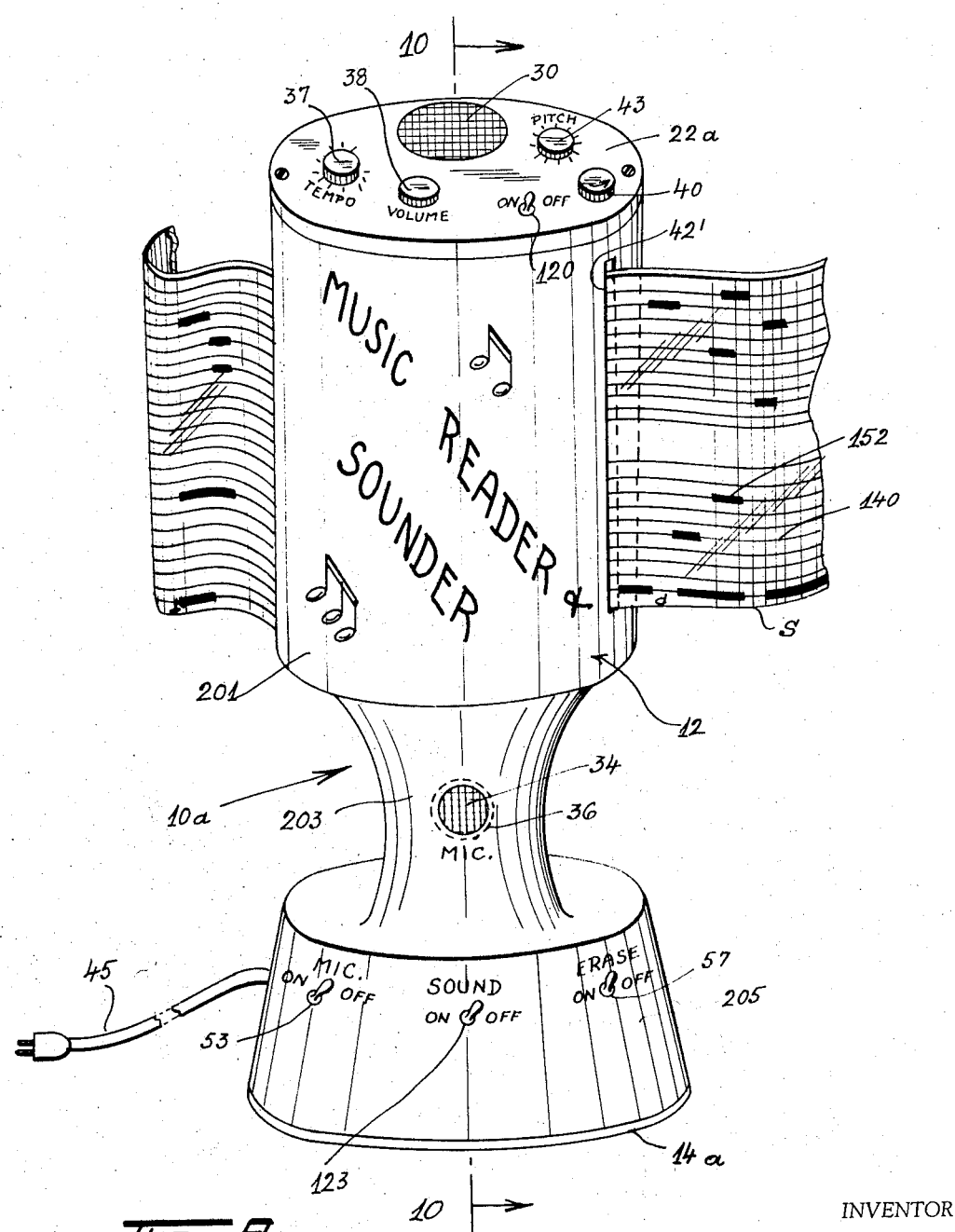

3,424,851
PRINTED SHEET MUSIC READING AND
PLAYING DEVICE
Dorothea M. Weitzner, 8 E. 62nd St.,
New York, N.Y. 10021
Filed Aug. 31, 1965, Ser. No. 483,967
U.S. Cl. 84—1.28   8 Claims
Int. Cl. G10h 3/04

ABSTRACT OF THE DISCLOSURE

A music reading and sounding device having an enclosure through which is drawn a sheet on which are opaque elements coded to correspond to musical sounds. Photoelectric cells scan the coded elements and deactivate associated relays which close their contacts connected in circuit with magnetic heads. The magnetic heads then pick up prerecorded musical sounds from magnetic tracks on a drum and apply audio signals to an amplifier and loudspeaker. Sounds can also be recorded on the tracks via contacts of the relays.

---

Figure 10:
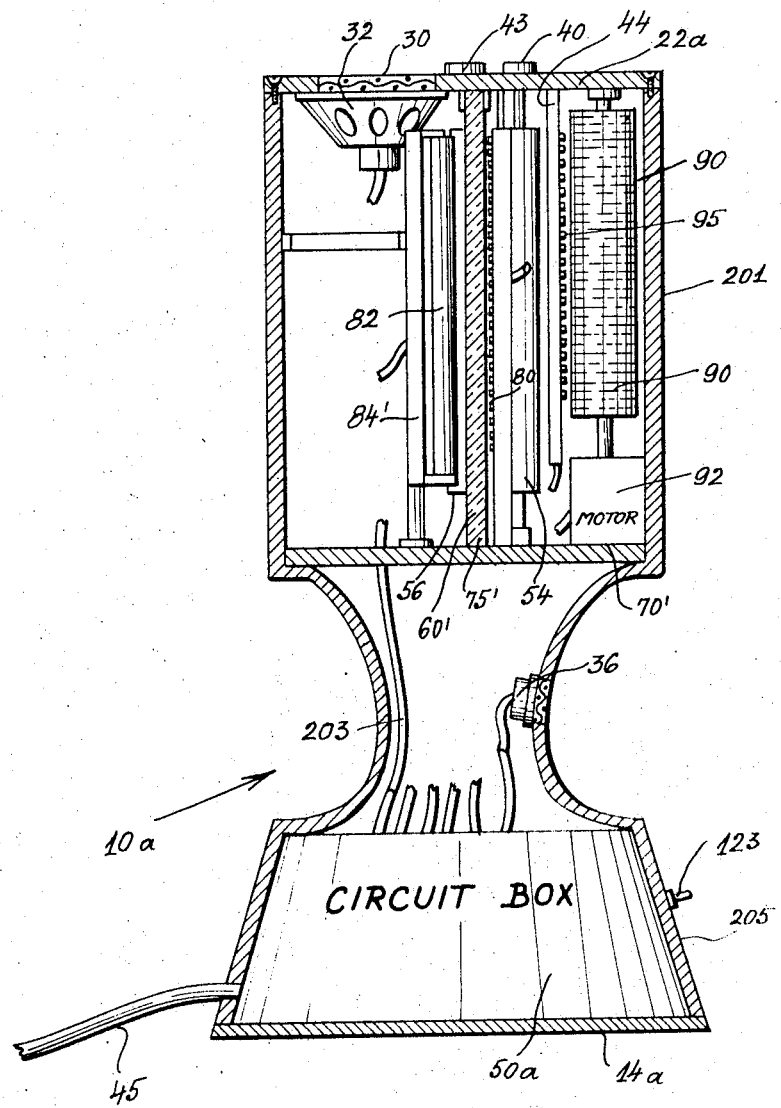

This invention concerns a printed sheet music reading and playing device, whereby music notes printed, written or otherwise applied on a sheet are sounded as the sheet is passed through the device.

It is one object of the invention to provide a device which a composer can use after he has written music on a sheet, to listen to the sound of the music reproduced as written.

Another object is to provide a device which will produce sounds ranging over one, two or more octaves, automatically as a music sheet is passed therethrough, the sounds corresponding to the notes appearing on the sheet.

A further object is to provide a device as described, wherein the character of the sounds produced can be changed to simulate any one of a number of different musical instruments.

According to the invention, the device is housed in a convenient sized cabinet with controls for changing tempo and loudness. Sounds spaced in pitch by chromatic note intervals are prerecorded in the device. When a sheet bearing music notes according to a musical notation code is passed through the device each of the written or printed notes is reproduced audibly. Chords consisting of two or more notes are also reproduced. The recorded sounds are sustained tones, for example those of a wind or stringed instrument. The device is provided with means for erasing any one or all of the prerecorded sounds and rerecording sounds of some other instrument. The device makes it possible for musicians, composers, students and others to hear how music recorded in musical notation on a sheet actually sounds.

For further comprehension, and for a better understanding of the invention, reference may be had to the following detailed description taken in connection with the accompanying drawing, in which FIGURE 1 is a perspective view of a device embodying the invention, FIG. 2 is a cross sectional view taken on line 2—2 of FIG. 1, FIGS. 3, 4 and 5 are sectional views taken on lines 3—3, 4—4 and 5—5 respectively of FIG. 2, FIG. 6 is a diagram of the electrical circuit arrangement of the device, FIG. 7 is a musical notation chart which may be made use of in one phase of operation of the device, FIG. 8 is a special setup which can be used in another phase of operation of the device, FIG. 9 is an elevational view of another device embodying the invention, FIG. 10 is a vertical sectional view taken on line 10—10 of FIG. 9, FIG. 11 is an oblique view of part of a music sheet, and FIG. 12 is an enlarged sectional view taken on line 12—12 of FIG. 11.

Referring first to FIGS. 1–5, there is shown the device 10 housed in a cabinet 12 including a flat bottom baseboard 14 and cover 16. The cover has a bottom peripheral flange 18 engaged in a rectangular recess defined by a rectangular rim 20 formed all around the baseboard. The cover is readily removable from the baseboard to expose internal parts for servicing and other purposes.

Cover 16 is actually an open bottom box with a closed horizontal top wall 22 generally rectangular smaller vertical end walls 24, 25 and longer rectangular vertical front and rear walls 26, 28. In the top wall 22 is an opening 29 closed by a screen 30 under which is mounted a loudspeaker 32 to radiate sound omnidirectionally from the cabinet. In front wall 26 is an opening 33 closed by a screen 34 behind which is a microphone 36; see FIG. 2. On end wall 24 are rotatable knobs 37, 38 of speed and loudness controls designated TEMPO 35, 39 respectively and VOLUME. Another speed control 41 designated PITCH has an operating knob 43 at wall 24. A knob 40 on wall 24 is used for engaging the end of a music sheet S to draw it into the device. A long horizontal slot 42 is formed in front wall 26 through which the sheet enters. Another similar slot 44 is provided in the rear wall 28 through which the sheet S passes out of the device. An electric power supply cord 45 terminating in a plug 46 passes through a slot 47 in wall 24 and terminates at circuit box 50 mounted on the baseboard, as best shown in FIG. 3. Switches 53, 57 designated MIC. and ERASE are mounted on baseboard as best shown in FIG. 3 on the top wall 22.

Just inside the cover at the rear side of front wall 26 are two horizontally extending paper guide members 51, 52 located at upper and lower edges respectively of slot 42. Just to the rear of these paper guides are upper and lower resilient idler rollers 54, 56. These rollers are axially horizontal and the sheet S passes between them from guides 51, 52. Roller 54 has a shaft 55 which extends outwardly of wall 24 and knob 40 is attached to the outer end of this shaft. When the knob is turned as a sheet is inserted into the slot 40, the leading edge of the sheet will be engaged between the rollers. Continued turning of the knob will advance the sheet over a horizontal transparent plate 60 which serves as a platen. The sheet will be advanced to rollers 62, 64 where it will be engaged therebetween.

Upper roller 64 is a drive roller whose shaft 63 is coupled to motor 65 on the baseboard; see FIG. 3. Lower roller 62 is an idler roller. The shafts of the four axially horizontal rollers 54, 56 and 62, 64 are journalled in bearings 66 on end wall 25. Platen 60 is also supported at end wall 25. A vertical partition 70 is provided inside the cover parallel to the end walls and is removably disposed in projections 72 on walls 26, 28. The platen 60 and shafts of the rollers may also be journalled in holes in partition 70.

Located just above the horizontal platen and extending along the platen horizontally and lengthwise of the device is a long narrow hollow box 75 in which are mounted a multiplicity of photoelectric cells, 80. The cells face downward in order to receive light passing through the platen from a long cylindrical illuminating lamp 82 underneath the platen. The lamp is supported in a fixture 84 on the baseboard. The lamp extends horizontally parallel to the linear array of photoelectric cells.

Paper guide members 85, 86 are provided at upper and lower edges of slot 44 on the forward side of the rear wall 28. The sheet S is guided between these members out of the cabinet 12.

An axially horizontal drum 90 is located inside the cabinet. It has a shaft 91 journaled between end wall 25 and a motor 92 located at end wall 24; see FIG. 4. This drum has a magnetic surface coating 93 on which is prerecorded a multiplicity of audio signal tracks T extending circumferentially of the drum. Adjacent to the drum 90 is a horizontal bar 94 carrying a multiplicity of magnetic transducer heads 95. These heads can pick up magnetically recorded signals from the respective tracks and can convert them to electrical pulses. Conversely they can record magnetically on the drum audio frequency signals applied as electrical pulses to the heads. Bar 94 is supported by brackets 96 at the underside of top wall 22.

The magnetic heads, photoelectric cells, motors, loudspeaker, microphone, and all other electrical components of the device are connected to the electrical circuit 100 which will now be described with reference to FIG. 6. In circuit 100, the power supply cord 45 provides electric power from a suitable external power source. One wire 102 is connected directly to lamp 82, motor speed controls 35, and one end of each coil 104 of a multiplicity of relays 106.

Each of the speed controls 35, 41 is connected to its associated motor 65 and 92 respectively for adjusting its speed. Each of the relays 106 has a movable pole 108 normally closed with a contact 110 when the relay is deenergized. The other end of each coil 104 is connected to one end of an associated photoelectric cell. There is an equal number of photoelectric cells and relays. This number is equal to the number of signal tracks T on magnetic coating 93 of drum 90 and to the number of magnetic heads 95 at the respective tracks.

The photoelectric cells 80 are preferably of the photoconductive type. Their internal resistance is reduced when light falls upon them. The other end of each cell 80 is connected to power supply wire 111. Switch 120 designated ON-OFF on wall 24 of the cabinet is connected in series with wire 111. Wire 111 is also connected to lamp 82 and speed controls 35, 41.

Relay contacts 110 are all connected to one input terminal of an amplifier 125. Loudspeaker 32 is connected to the output of this amplifier. Amplifier 125 is connected to power supply wires 102 and 111, which provide power thereto. The other input terminal of the amplifier is connected to one terminal 95' of each of the magnetic heads 95. The other terminal 95" of each magnetic head is connected to the pole 108 of its own associated relay 106. Switch 123 is in series with the loudspeaker and cuts off the loudspeaker when it is open. This switch is mounted on wall 22 and is designated SOUND in FIG. 2.

Microphone 36 is connected to an amplifier 130 which is turned on and off by switch 53. The input terminals of this amplifier are connected to the microphone. One output terminal is connected to each of relay contacts 110 via switch 53. The other output terminal is connected to one of terminals 95' of the magnetic heads. A high frequency oscillator 132 is provided for erasing tracks T selectively from drum 90. One terminal of this oscillator is connected via switch 57 to each of relay contacts 110. The other terminal of the oscillator is connected to each of terminals 95 of the magnetic heads. Both the oscillator 132 and amplifier 130 are energized by power supplied via power supply wires 102, 111.

The musical tones recorded on the respective tracks T are designated in FIG. 6 by notations A—A covering two octaves. Twenty-five tracks are required to record chromatic notes of two octaves. Thus there will be twenty-five relays, magnetic heads and photoelectric cells. If more octaves are provided for in the device there will be a larger number of relays, magnetic heads and cells.

The sheet S which is used in the device is preferably a translucent type of paper such readily available commercially. Preprinted on this paper is a multiplicity of lines 140 which may be identified by chromatic note designations 142 as shown on sheet S in FIG. 1 To use this sheet a composer will transcribe a musical composition written in conventional musical notation according to the legend or code C indicated at the bottom margin of the sheet. This code is best shown on a chart 150 in FIG. 7. Here each musical note 151 corresponds to a different length of dark, opaque mark 152. The transcriber will use this code in transcribing printed music onto a sheet S. Alternatively, music can be originally printed in this coded musical notation. Instead of marks, opaque strips 152a with adhesive 153 on one side can be removably applied to transparent sheet S on lines 140 as shown in FIGS. 11 and 12. The lengths of the strips will correspond to the time values of the notes.

To use the device for reproducing audibly the musical selection written, printed, or applied by opaque strips on the sheet S, the leading edge of the sheet will be inserted in slot 42 after switch 120 is set to ON position. The power cord 45 will be connected to a suitable power supply. As knob 40 is turned the paper will be drawn between rollers 54, 56 then over platen 60 to rollers 62, 64 where the sheet will be engaged and drawn automatically rearwardly to pass out of slot 44. As the opaque elements 152 pass between a particular cell 80 aligned with one of lines 140, and lamp 82, the light reaching the cell will be cut off and the associated relay 106 will be deenergized so that pole 108 will close with contact 110. This will close the signal circuit of an associated one of magnetic heads 95 which will pass an audio frequency electrical signal to the amplifier 125 for audible reproduction by loudspeaker 32. Chords consisting of two or more sounds indicated by two or more opaque elements 152 aligned with each other transversely of sheet S will be reproduced as audible chords.

If the sheet S has been prepared by a composer, he may decide to change the musical notation after hearing how it sounds in the device. To do this it is only necessary to remove the opaque elements by erasing or physical detachment and to replace them with other opaque elements as the composer may desire.

Suppose the musical sounds recorded are those of an instrument such as a flute and the composer desires to hear the composition as it would sound played by another instrument, as a trumpet. The recorded sounds on track T can be changed in the following manner. The operator will pass an opaque sheet of paper through the device after first closing the erase switch 57. This will activate the oscillator 132 and all signals will be erased from all tracks. Then switch 57 is opened and the switch 53 in the recording circuit will be closed. Switch 123 should be opened. Then sheet S' shown in FIG. 8 will be used. This is simply a transparent sheet on which opaque elements 152' of equal length are applied on the lines 140'. There is only one opaque element per line to effect closing the circuit of each magnetic head in turn as its associated cell 80 "reads" the element 152'. As each opaque element passes the cells 80, the operator will sound a different note on the instrument corresponding to the sound desired to be recorded. This will be picked up by the microphone and recorded via amplifier 130 and the associated heads 95.

The time of passage of each opaque element will correspond to one rotation of drum 90.

If the operator desires to erase only one recorded sound or any number of recoded sounds less than all, then a sheet S may be made up with opaque elements 152 or 152a thereon corresponding to the notes to be erased. When this sheet is passed through the device with switch 57 closed the sounds will be erased from the selected tracks. New sounds can be recorded thereon by opening switch 57, closing switch 53 and sounding the desired sounds at microphone 35. Recording sheet S' will then have opaque elements 152' only on those lines corresponding to the erased tracks.

During normal playing of a musical selection on a sheet S as previously described, the operator can increase tempo by adjusting speed control 35. The operator can increase the loudness of sound by adjusting control 39 which is connected in the input circuit of amplifier 125 as shown in FIG. 6. The operator may desire to note the effect of a slight change in pitch of the reproduced sound either higher or lower. This is accomplished by adjusting control 41 which increases or decreases the speed of the drum drive as the control is adjusted.

In FIGS. 9 and 10 is shown another device 10a which is identical to device 10 insofar as operations and circuitry are concerned and the description of circuit 100 applies. Components of device 10a corresponding to those of device 10 are identically numbered.

The device 10a has a cabinet 12a which includes a generally cylindrical body 201. It is axially vertical and has an axially vertical hollow tapered neck 203. The neck connects with a frustoconical base 205 which rests on a circular removable baseboard 14a. The microphone 36 is mounted in neck 203. The circuit box 50a is disposed on the baseboard. The MIC., ERASE, and SOUND controls 53, 57 and 123 are mounted on the side wall of base 205. On the top of the cabinet is a removable cover plate or wall 22a. The loudspeaker 32 is secured to this wall and projects sounds upwards omnidirectionally as in the device 10. The TEMPO, VOLUME and PITCH control knobs 37, 38, 43 and switch 120 are mounted on top wall 22a. Knob 40 which advances sheet S is also located on the top of wall 22a.

Platen 60' is vertically disposed as are drum 90, lamp 82, lamp fixture 84', bar 94' supporting magnetic heads 95, and box 75' supporting photoelectric cells 80. The motor 92 driving drum 90 rests on a horizontal apertures partition 70' inside the cylindrical body 201, as do lamp fixture 84', box 75 and the sheet drive roller. All the rollers which drive sheet S through the device are axially vertical. The sheet enters the cabinet through slot 42' which is vertical and leaves through a similar vertical slot in the opposite side of the cabinet.

For various reasons including space limitations, ease of handling and portability, the form of device 10a may be preferred to that of device 10. However, both forms of the device operate in the same manner and perform the same functions.

Both devices provide means for instantly playing music appearing on a sheet in musical notation coded to correspond to conventional musical notation. The versatility and ease of operation of the devices make them extremely useful musical appliances. They can be used in schools, music practice rooms, and the like. They are light in weight for easy portability, and are pleasing in appearance so that they can be placed in rooms where aesthetic considerations are important.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A music reading and sounding device, comprising an enclosure; means for drawing a music sheet longitudinally through said enclosure, said sheet being substantially transparent and having opaque elements thereon disposed in a multiplicity of lines spaced transversely of the sheet; means supporting a multiplicity of photoelectric cells in said enclosure for sensing the presence of said opaque elements on said lines, respectively; a plurality of relays connected in circuit with and operated by said photoelectric cells, respectively, said relays having normally closed contacts opened when the relays are actuated; a magnetic recording medium in said enclosure, said recording medium having a multiplicity of musical sounds recorded magnetically thereon in a multiplicity of tracks; a plurality of transducers disposed to pick up said magnetically recorded sounds from the tracks, respectively; an amplifier; a loudspeaker, each of said transducers being connected in a sound reproducing circuit including said amplifier, said loudspeaker and a pair of said relay contacts; a plurality of activating circuits, each of said activating circuits including one of said photoelectric cells, one of said relays and one of said transducers, whereby certain ones of said transducers are effective to pass audio signals to said sound reproducing circuit when certain photoelectric cells detect opaque elements on certain lines of said sheet; means connected in another circuit with said transducers and said relay contacts for erasing the magnetically recorded sounds from selected tracks when another transparent sheet bearing opaque elements on certain lines thereof is passed through the enclosure; and a sound recording circuit connected to each of the transducers via said pair of relay contacts for recording a different sound on each of the tracks selectively when a further transparent sheet bearing opaque elements on lines corresponding to said selected tracks is passed through said enclosure.

2. A music reading and sounding device as defined by claim 1, further comprising means for adjusting the speed at which said sheet is drawn through said enclosure to vary the length of time during which each of the reproduced sounds is sounded.

3. A music reading and sounding device as defined by claim 2, wherein said magnetic recording medium is movable, and further comprising means for adjustably driving said magnetic recording medium at different speeds, whereby the pitches of the reproduced sounds are selectively varied.

4. A music reading and sounding device as defined by claim 1, wherein said enclosure is a cabinet with horizontal top wall, said loudspeaker being mounted at said top wall to radiate sound omnidirectionally out of the top wall of the cabinet.

5. A music reading and sounding device as defined by claim 4, wherein said cabinet has horizontal slots at opposite sides thereof so that the sheet passes horizontally into and out of the cabinet through said slots.

6. A music reading and sounding device as defined by claim 4, wherein said cabinet has an axially vertical generally cylindrical body with vertical slots on opposite vertical sides of the cabinet for passing said sheet in a vertical position into and out of the enclosure.

7. A music reading and sounding device as defined by claim 6, wherein said recording circuit comprises a microphone mounted at a side of the cabinet for receiving impinging sounds to be recorded on the tracks.

8. A music reading and sounding device as defined by claim 1, further comprising a light source in the enclosure disposed to illuminate the photoelectric cells, said cells being photoconductive with internal resistances which increase when light is cut off from the cells, whereby the relays are deactivated and their open contacts close when said opaque elements cut off light from the photoelectric cells, so that the transducers pick up recorded sounds from the tracks and pass corresponding audio signals to the amplifier and loudspeaker.

References Cited

UNITED STATES PATENTS

| | | | |
|---|---|---|---|
| 1,369,764 | 2/1921 | Vanderbijl | 84—1.03 |
| 1,969,680 | 8/1934 | Zoppa | 84—1.03 |
| 2,471,534 | 5/1949 | Muth et al. | 84—1.28 |
| 2,563,647 | 8/1951 | Hammond | 84—1.28 |
| 2,573,748 | 11/1951 | Weinstein et al. | 84—1.28 |
| 3,193,608 | 7/1965 | Bobis | 84—1.28 |

OTHER REFERENCES

QST, October 1961, pp. 62–64, "Lazy Man's CQ-er."

JOHN S. HEYMAN, *Primary Examiner.*

HAROLD A. DIXON, *Assistant Examiner.*